United States Patent
Bohn et al.

(10) Patent No.: US 9,063,331 B2
(45) Date of Patent: Jun. 23, 2015

(54) OPTICAL SYSTEM FOR NEAR-EYE DISPLAY

(71) Applicants: David D. Bohn, Fort Collins, CO (US); Ned Nestorovic, Seattle, WA (US)

(72) Inventors: David D. Bohn, Fort Collins, CO (US); Ned Nestorovic, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 156 days.

(21) Appl. No.: 13/777,562

(22) Filed: Feb. 26, 2013

(65) Prior Publication Data

US 2014/0240613 A1 Aug. 28, 2014

(51) Int. Cl.
| | |
|---|---|
| *G02F 1/1335* | (2006.01) |
| *G02B 27/01* | (2006.01) |
| *G02F 1/13* | (2006.01) |
| *G02B 27/28* | (2006.01) |
| *G02B 5/30* | (2006.01) |

(52) U.S. Cl.
CPC .......... *G02B 27/0172* (2013.01); *G02F 1/1313* (2013.01); *G02B 2027/015* (2013.01); *G02B 2027/0178* (2013.01); *G02B 27/283* (2013.01); *G02B 5/30* (2013.01); *G02B 2027/0114* (2013.01)

(58) Field of Classification Search
CPC . G02B 27/0172; G02B 27/283; G02F 1/1313
USPC ................ 349/5–10, 11, 13; 359/629–633
See application file for complete search history.

(56) References Cited

U.S. PATENT DOCUMENTS

| | | |
|---|---|---|
| 7,021,777 B2 | 4/2006 | Amitai |
| 7,589,902 B2 | 9/2009 | Garoutte et al. |

(Continued)

FOREIGN PATENT DOCUMENTS

| | | |
|---|---|---|
| WO | 02088825 A2 | 11/2002 |
| WO | 2008023367 A1 | 2/2008 |

OTHER PUBLICATIONS

Zhang, et al., "Design of a polarized head-mounted projection display using FLCOS microdisplays", Retrieved at <<http://3dvis.optics.arizona.edu/publications/pdf/zhang_pHMPD_spie07.pdf>>, Proc. of SPIE (International Society for Optical Engineering), vol. 6489, Jan. 2007, pp. 10.

(Continued)

*Primary Examiner* — Michael Caley
(74) *Attorney, Agent, or Firm* — Jeremy Snodgrass; Judy Yee; Micky Minhas

(57) ABSTRACT

Embodiments are disclosed herein that relate to compact optical systems for incorporation into near-eye display devices. For example, one disclosed embodiment provides a near-eye display system may comprising a light source, a first polarizing beam splitting surface configured to receive light from the light source, a mirror configured to reflect light passed by the first polarizing beam splitting surface, and a quarter wave plate positioned between the first polarizing beam splitting surface and the mirror. The near-eye display system may further include a second polarizing beam splitting surface positioned at an angle relative to the first polarizing beam splitting surface and a microdisplay configured to produce an image via light received from the second polarizing beam splitting surface.

20 Claims, 5 Drawing Sheets

(56) References Cited

U.S. PATENT DOCUMENTS

| | | | |
|---|---|---|---|
| 2002/0191297 A1* | 12/2002 | Gleckman et al. | 359/629 |
| 2009/0015735 A1* | 1/2009 | Simmonds | 349/11 |
| 2009/0027772 A1 | 1/2009 | Robinson | |
| 2009/0290863 A1* | 11/2009 | Asakura et al. | 396/382 |
| 2011/0037951 A1 | 2/2011 | Hua et al. | |
| 2011/0317233 A1* | 12/2011 | Hayashibe et al. | 359/201.2 |
| 2012/0062445 A1 | 3/2012 | Haddick et al. | |
| 2012/0162549 A1 | 6/2012 | Gao et al. | |
| 2013/0016292 A1* | 1/2013 | Miao et al. | 349/11 |
| 2013/0250415 A1* | 9/2013 | Gupta | 359/489.09 |

OTHER PUBLICATIONS

Martins, et al., "Projection-based head-mounted displays for wearable computers", Retrieved at <<http://www.creol.ucf.edu/Research/Publications/1431.pdf>>, Proceedings of SPIE (International Society for Optical Engineering) vol. 5442, Sep. 8, 2004, pp. 7.

European Patent Office, International Search Report & Written Opinion for PCT Patent Application No. PCT/US2014/018127, May 27, 2014, 12 Pages.

\* cited by examiner

OPTICAL SYSTEM FOR NEAR-EYE DISPLAY

BACKGROUND

A near-eye display device, such as a head-mounted display, may include various optical components arranged within the device, such as light sources, image producing elements, lens systems, and/or other optical elements. Such optical components may occupy a considerable amount of space, which may result in a near-eye display having a bulky design. As some near-eye displays may be configured to be worn by users, a bulky design may cause a near-eye display to be uncomfortable, unattractive from a design standpoint, and/or otherwise unappealing to end users.

SUMMARY

Embodiments are disclosed herein that relate to compact optical systems for incorporation into near-eye display devices. For example, one disclosed embodiment provides a near-eye display system comprising a light source, a first polarizing beam splitting surface configured to receive light from the light source, a mirror configured to reflect light passed by the first polarizing beam splitting surface, and a quarter wave plate positioned between the first polarizing beam splitting surface and the mirror. The near-eye display system further includes a second polarizing beam splitting surface positioned at an angle relative to the first polarizing beam splitting surface and a microdisplay configured to receive light reflected by the second polarizing beam-splitting surface and produce an image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed herein that relate to compact optical systems for use in near-eye display systems. Briefly, the disclosed embodiments comprise a compact folded optical path that utilizes polarized light and polarization-sensitive optical components to direct light through the optical path. The disclosed embodiments permit an illumination system to be arranged at an angle to other components of the optical system, and therefore may permit the optical system to be incorporated into a portion of a head-mounted display device that follows a curvature of a user's head. As such, the optical system may facilitate the design of a compact and low-profile near-eye display device.

Figure 1:
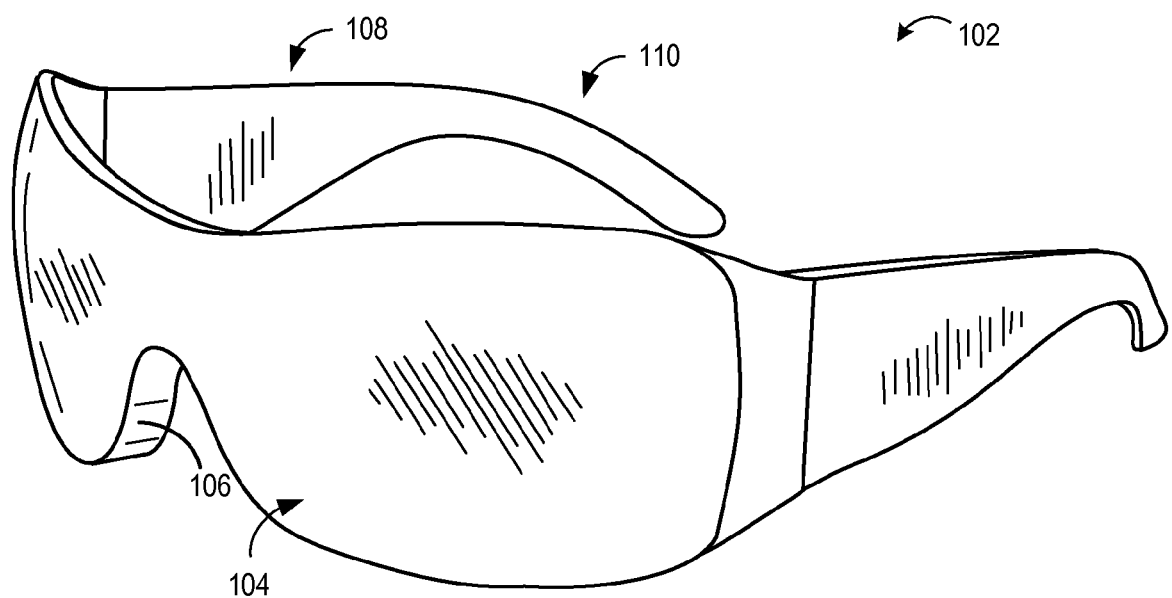
FIG. 1 shows an example near-eye display system in accordance with an embodiment of the present disclosure.

FIG. 1 shows a non-limiting example of a display device 102 in the form of a head-mounted display device including a display 104. The display 104 may comprise any suitable display system, including but not limited to a waveguide display system. The display 104 may be at least partially transparent, thus allowing light from a background scene to pass through the see-through display to the eyes of a user. This may allow the display device 102 to be utilized to visually augment an appearance of the background scene by displaying virtual objects viewable along with real objects in the background scene.

The display device 102 may include various input and output devices. For example, the display device 102 may comprise an audio output, such as one or more speakers, in addition to the display 104. Likewise, the display device 102 may comprise various input sensors, such as a microphone, one or more forward-facing (e.g. facing away from user) infrared and/or visible light cameras, and/or one or more rearward-facing (e.g. facing towards user) infrared and/or visible light cameras. In some embodiments, the forward-facing camera(s) may include one or more depth cameras and associated light projectors. Likewise, in some embodiments, the rearward-facing cameras may include one or more eye-tracking cameras. Further, in some embodiments, an onboard sensor system may communicate with one or more off-board sensors that send sensor data to the onboard sensor system via a wireless and/or wired communication system of the display device 102.

The display device 102 also includes one or more features that allow the display device to be worn on the head of a user. In the illustrated example, the display device 102 takes the form of eyeglasses and includes a nose rest 106, side pieces 108, and ear rests 110. In other embodiments, a head-mounted display may include a hat or helmet with a display in the form of a see-through visor, for example. While described herein in the context of a head-mounted see-through display, the concepts described herein may be applied to any other suitable display system, including displays that are not see-through.

Figure 2:
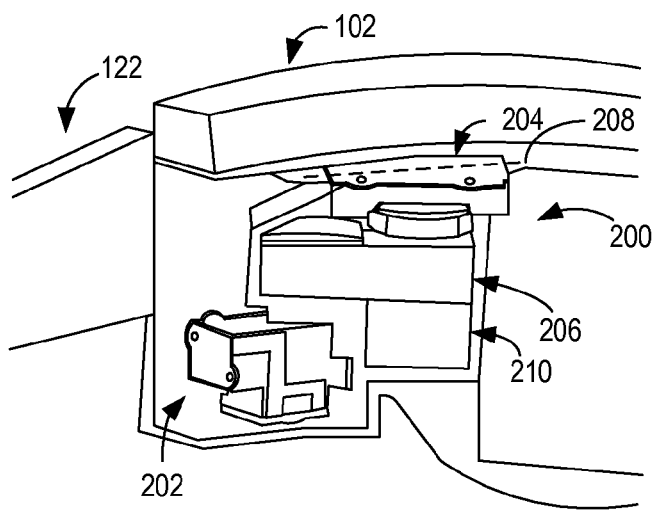
FIG. 2 shows an example optical system for a near-eye display system in accordance with an embodiment of the present disclosure.

FIG. 2 shows an example embodiment of an optical system 200 suitable for use with display device 102. As depicted, the optical system 200 may be positioned to a side of the display 104, e.g. adjacent to side piece 108 of the frame. The optical system 200 may include an illumination system 202 for producing light to illuminate a microdisplay 204. The illumination system 202 may be mounted at an angle relative to a plane of other optical components of the optical system 200, as described below, so that the optical system may conform generally to a curvature of a temple area of a user's head. The illumination system 202 may utilize any suitable light sources, including but not limited to one or more color light-emitting diodes (LEDs) one or more laser diodes, one or more white LEDs, etc.

Figure 3:
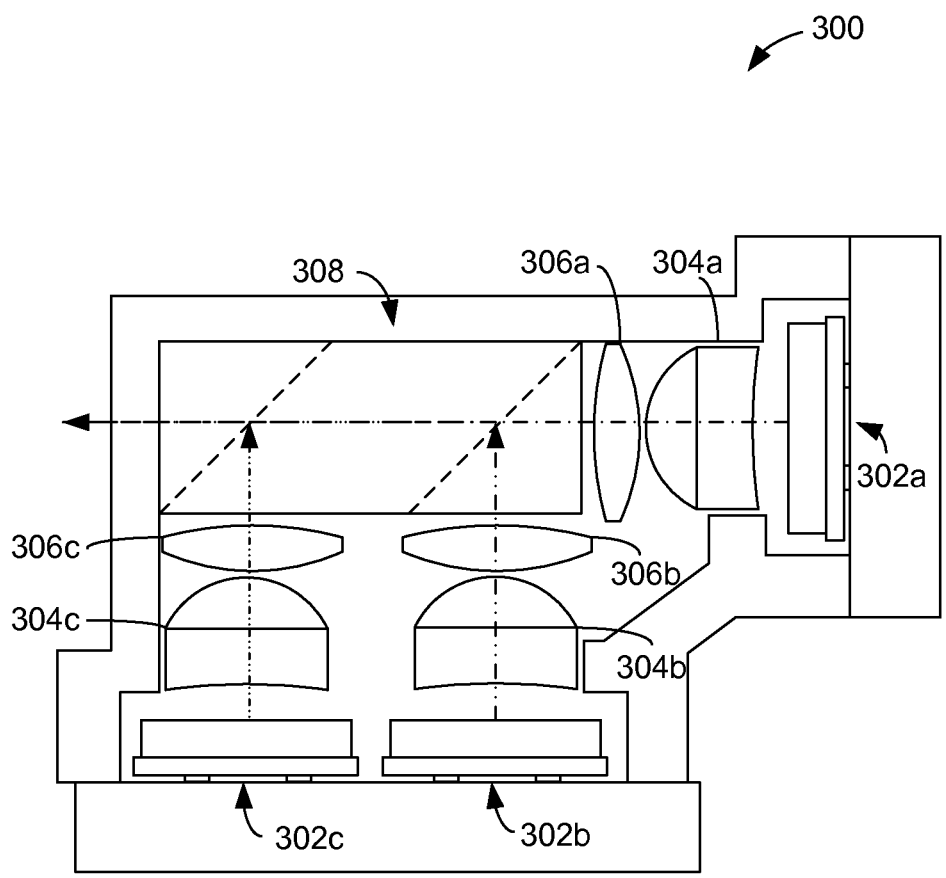
FIG. 3 shows an example illumination assembly in accordance with an embodiment of the present disclosure.

FIG. 3 shows an example of an illumination system 300 suitable for use as illumination system 202 of FIG. 2. The illumination system 300 includes a first light source 302a, a second light source 302b, and a third light source 302c. In some embodiments, the light sources 302a-c may correspond to red, green, and blue LEDs of an RGB LED assembly. In other embodiments, RGB lasers may be utilized. The use of RGB lasers may offer the potential advantage of outputting polarized light. As depicted, the second and third light sources 302b and 302c may be positioned at an angle to the first light source 302a, and to a direction in which light exits the illumination system 300. Light emitted from each of light source may pass through a collector and focusing lens, shown respectively at 304a-c and 306a-c for light sources 302a-c. The collectors and focusing lenses may be configured to direct light emitted from the light sources through dichroic beam splitters 308 to focus on a microlens array. The dichroic beam splitters 308 may be configured to pass light from the first light source 302a and reflect light from the second and third light sources 302b and 302c so that light from each of the light sources exit the dichroic beam splitters 308 in a same direction. It will be noted that illumination system 310 may be rotated about the optical axis of light that exits the illumination system relative to downstream optics without affecting light passing through the downstream optics. This may allow illumination system 310 to be positioned relative to other optics to generally conform to a contour of a user's temple.

Figure 4:
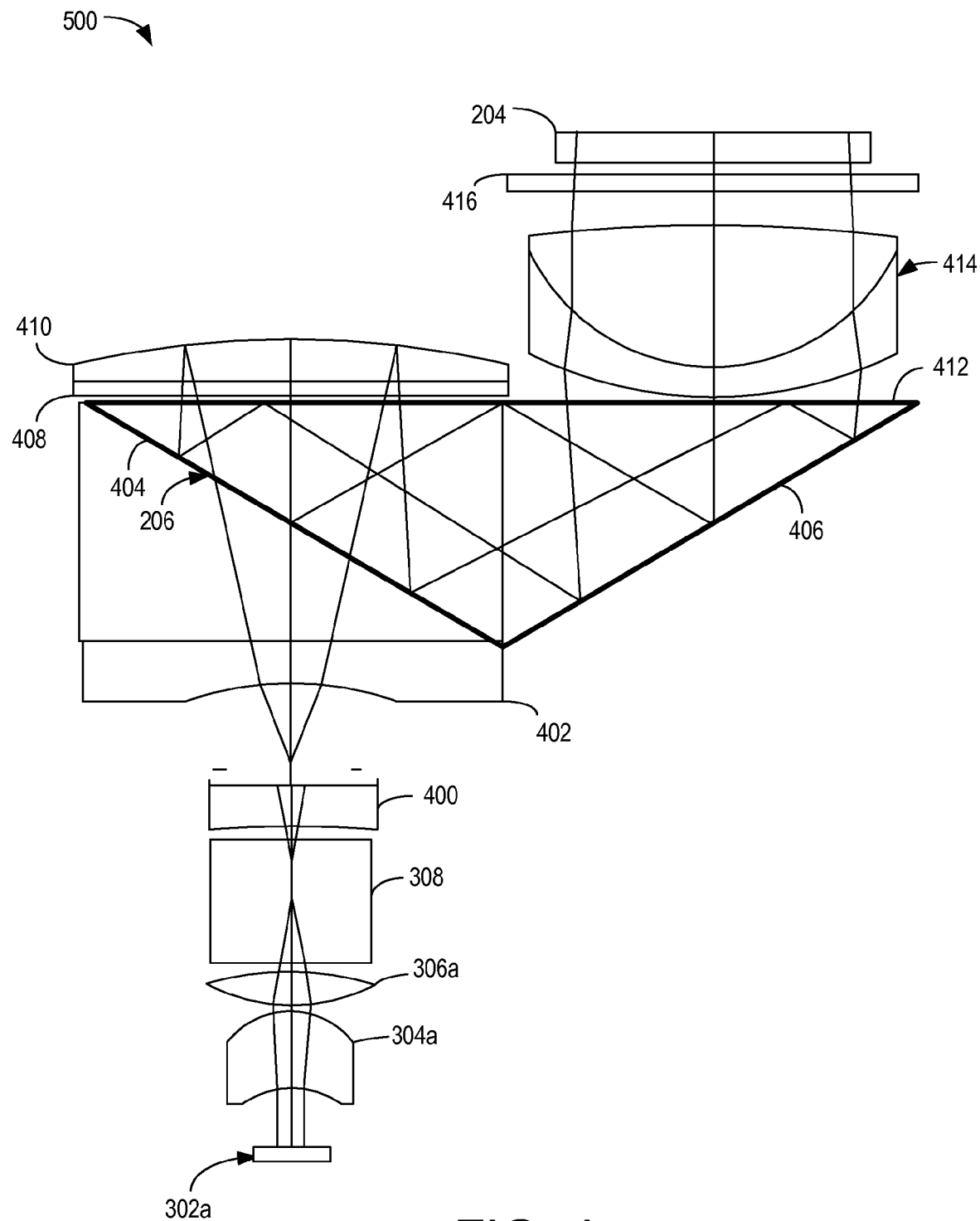
FIG. 4 schematically shows a schematic depiction of the embodiment of FIG. 2.

Referring again to FIG. 2, light exiting the illumination system may pass through other optical elements to a polarizing beam splitter 206. FIG. 2 depicts an example location of the polarizing beam splitter 206 in optical system 200, and FIG. 4 shows a schematic depiction of a path of light through example components in the form of a microlens array 400 and a negative element 402 before reaching the polarizing beam splitter 206. In some embodiments, one or more of the lens elements (e.g. the negative element 402) near the light source may be aspheric. Further, the microlens array 400 may be configured to match etendue of a microdisplay of the system. While FIG. 4 shows a single light source 302 for clarity, it will be understood that a plurality of light sources may be combined via dichroic beam splitters 308, as described above with reference to FIG. 3.

The polarizing beam splitter 206 may include a first polarizing beam splitting surface 404 and a second polarizing beam splitting surface 406 for directing light in a folded optical path toward the microdisplay 204. The first polarizing beam splitting surface 404 may be configured to polarize light received from the light sources 302a-c and pass the polarized light through a quarter wave plate 408 to a mirror 410. The mirror 410 is configured to reflect the light back through the quarter wave plate 408. After passing through the quarter wave plate 408 two times, the polarization state of the light is rotated by 90 degrees compared to its state before its initial pass through the first quarter wave plate 408. Thus, light from the mirror 410 is then reflected by the first polarizing beam splitting surface 404 toward a total internal reflection (TIR) surface 412 of the polarizing beam splitter 206, where the light is reflected by total internal reflection toward the second polarizing beam splitting surface 406. The second polarizing beam splitting surface 406 then reflects the light toward TIR surface 412 at a sufficient angle to exit the TIR surface without total internal reflection. Light exiting the polarizing beam splitter 206 may then pass through additional elements, such as a doublet lens 414, and a polarization-adjusting element 416, such as another quarter wave plate or a compensator, to the microdisplay 204, as described in more detail below. The polarizing beam splitter 206 may be immersed in a suitable medium such that light reflected by the first and second polarizing beams splitting surfaces and the total internal reflection surface is maintained within the medium.

The first and second polarizing beam splitting surfaces may be positioned at any suitable angle relative to each other. Likewise, the second polarizing beam splitting surface may also be positioned at any suitable angle relative to the microdisplay 204. For example, in some embodiments, the second polarizing beam splitting surface may be oriented at an angle of 20 to 50 degrees with respect to a longitudinal axis 208 of the microdisplay 204. In a more specific example, the second polarizing beam splitting surface may be oriented at an angle of 30 degrees relative to a longitudinal axis 208 of the microdisplay 204.

Any suitable type of microdisplay device may be used as microdisplay 204. For example, in some embodiments, the microdisplay 204 may comprise a liquid crystal on silicon (LCoS) display. In such embodiments, light incident on the microdisplay 204 is spatially modulated to produce an image and reflected back toward the second polarizing beam splitting surface 406. The polarization state of light reflected from the LCoS is rotated compared to light incident on the LCoS. However, due to such factors as manufacturing tolerances, the LCoS may not rotate the polarization state of the reflected light a full ninety degrees. Therefore, in such embodiments, the polarization adjuster 416 may comprise a compensator to complete the rotation of the light from the LCoS prior to passing the light through the second polarizing beam splitting surface. Referring again to FIG. 2, this light may then pass through projection optics 210, and be directed to display 104 (e.g. via a waveguide or other suitable optics).

In other embodiments, the microdisplay 204 may comprise another type of reflective microdisplay, such as a digital light processing (DLP) display. In such embodiments, the polarization adjuster 416 may comprise a quarter wave plate to rotate the light for transmission through the second polarizing beam splitting surface. In yet other embodiments, the microdisplay may comprise a transmissive microdisplay, such as a transmissive liquid crystal microdisplay. In such embodiments, the polarization adjuster 416 may be omitted.

Figure 5:
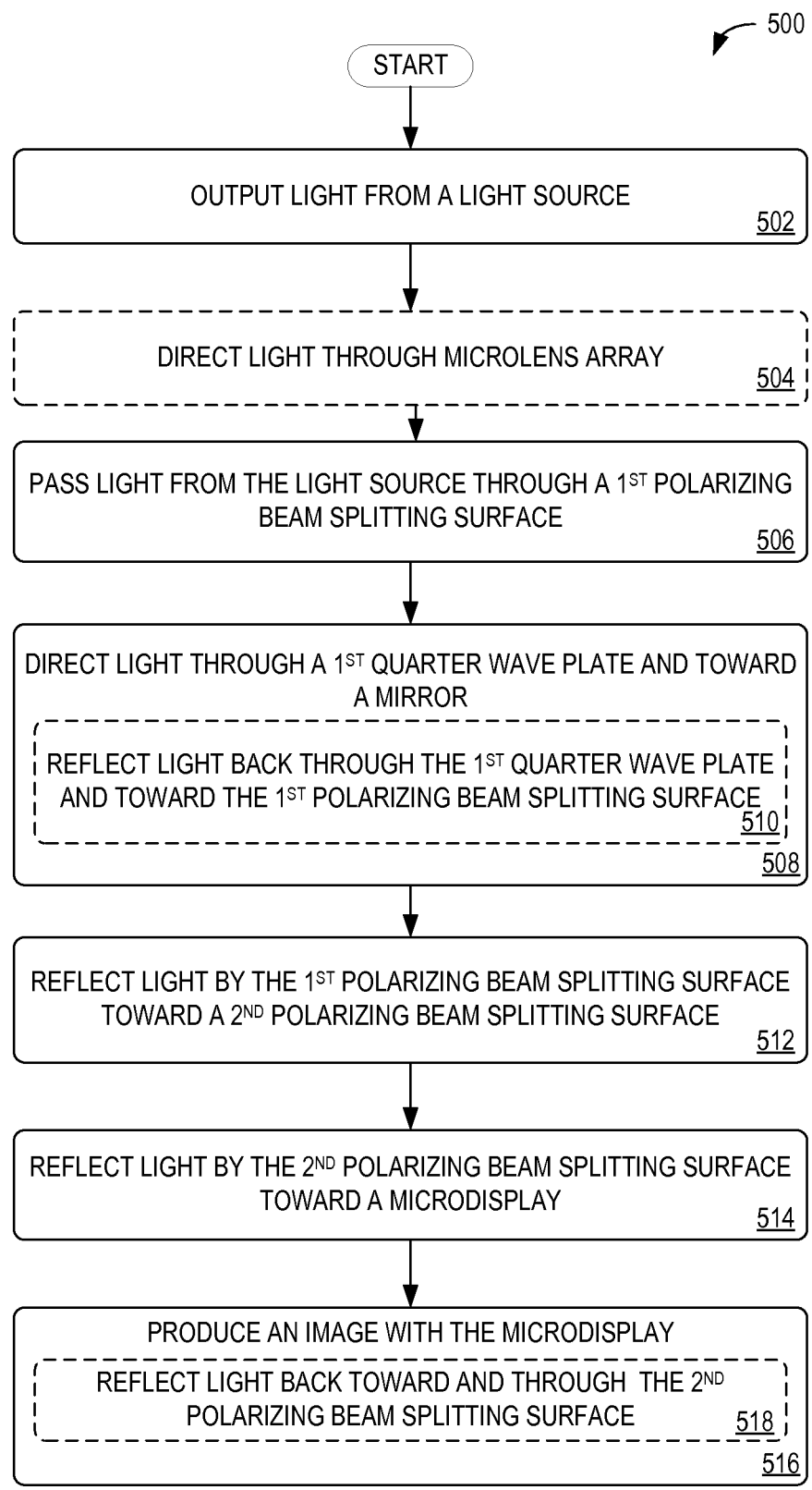
FIG. 5 is a flow chart depicting an example method of directing light through a near-eye display system in accordance with an embodiment of the present disclosure.

FIG. 5 shows a flow diagram depicting an example method 500 of directing light through a near-eye display system in accordance with an embodiment of the present disclosure. As indicated at 502, method 500 includes outputting light from a light source. Light from the light source may be directed through various components, such as a microlens array, as indicated at 504, and then through a first polarizing beam splitting surface, as indicated at 506, which linearly polarizes the light. It will be understood that, in other embodiments, another polarizer located optically upstream of the polarizing beam splitter may be used to polarize the light.

Method 500 further includes directing the portion of the light through a first quarter wave plate toward a mirror, as indicated at 508. The mirror reflects the portion of the light back through the first quarter wave plate, such that the polarization state is rotated a total of ninety degrees from the two passes through the quarter wave plate, and toward the first polarizing beam splitting surface, as indicated at 510. Next, method 500 includes reflecting the portion of the light via the first polarizing beam splitting surface toward a second polarizing beam splitting surface. In some embodiments, light reflected by the first polarizing beam splitting surface may reflect from a TIR surface toward the second polarizing beam surface, as described above with regard to FIG. 4.

Continuing, method 500 next includes, at 514, reflecting the portion of the light from the second polarizing beam splitting surface through the TIR surface, through a polarization adjuster in some embodiments, and toward a microdisplay for the production of an image, as indicated at 516. In some embodiments, a reflective microdisplay, such as an LCOS or DLP (digital light processing) display, may be used such that the microdisplay reflects light back toward the second polarizing beam splitting surface, as indicated at 518. In other embodiments, a transmissive microdisplay may be used. In embodiments that utilize a LCoS display, the polarization adjuster may comprise a compensator, while in embodiments that utilize another type of reflective microdisplay (e.g. a DLP display), the polarization adjuster may comprise a second quarter wave plate.

Thus, the embodiments disclosed herein may provide for a compact optical system configured to conform to a contour of a user's head, and thus that may allow the construction of a more compact and attractive near-eye display system. In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
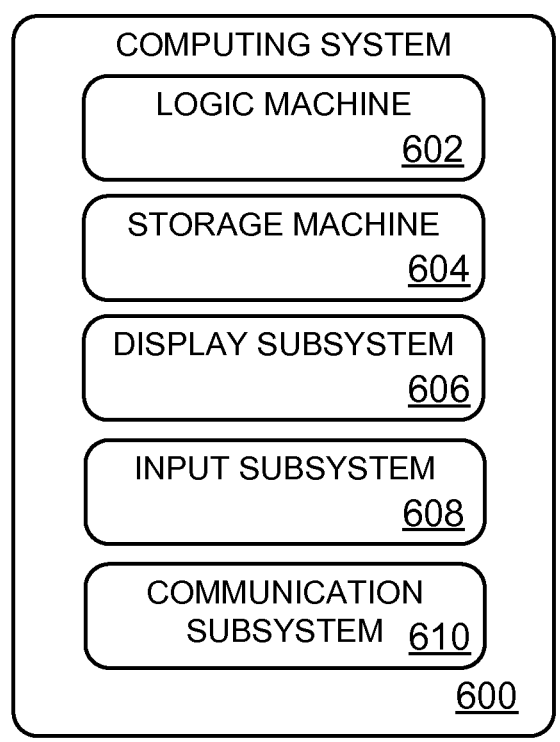
FIG. 6 shows a block diagram of an example computing system in accordance with an embodiment of the present disclosure.

FIG. 6 schematically shows a non-limiting embodiment of a computing system 600 that can enact one or more of the methods and processes described above. The computing system 600 is shown in simplified form. The computing system 600 may take the form of one or more near-eye display devices, head-mounted display devices, mobile communication devices (e.g., smart phone), mobile computing devices, tablet computers, server computers, gaming consoles, home-entertainment computers, network computing devices, personal computers, and/or other computing devices.

The computing system 600 includes a logic machine 602 and a storage machine 604. The computing system 600 further may include a display subsystem 606, an input subsystem 608, a communication subsystem 610, and/or other components not shown in FIG. 6.

The logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The storage machine 604 includes one or more physical devices configured to store and hold instructions (e.g., computer- and/or machine-readable instructions) executable by the logic machine to implement the methods and processes described herein. For example, the logic machine 602 may be in operative communication with a sensor interface (e.g. an interface of the input sensors of display device 102 of FIG. 1), and the storage machine 604. When such methods and processes are implemented, the state of the storage machine 604 may be transformed—e.g., to hold different data.

The storage machine 604 may include removable and/or built-in devices. The storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that the storage machine 604 includes one or more physical devices. However, aspects of the instructions described herein alternatively may be propagated by a communication medium (e.g., an electromagnetic signal, an optical signal, etc.).

Aspects of the logic machine 602 and the storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The display subsystem 606 may be used to present a visual representation of data held by the storage machine 604. For example, the display subsystem 606 may include one or more elements of the display 104 and/or the optical system 200 of FIG. 1. This visual representation may take the form of a graphical user interface (GUI), potentially presented as an augmented reality image in which real and virtual objects are both viewable through a see-through display. As the herein described methods and processes change the data held by the storage machine, and thus transform the state of the storage machine, the state of display subsystem 606 may likewise be transformed to visually represent changes in the underlying data. The display subsystem 606 may include one or more display devices utilizing virtually any type of technology. Such display devices may be combined with the logic machine 602 and/or the storage machine 604 in a shared enclosure, or such display devices may be peripheral display devices.

When included, the input subsystem 608 may comprise or interface with one or more user-input devices, including but not limited to a touch screen, keyboard, mouse, microphone, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 610 may be configured to communicatively couple the computing system 600 with one or more other computing devices. The communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow the computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A near-eye display system comprising:
    a light source;
    a first polarizing beam splitting surface disposed downstream of the light source along an optical path of the near-eye display system, the first polarizing beam splitting surface being configured to receive light from the light source;
    a mirror disposed downstream of the first polarizing beam splitting surface along the optical path, the mirror configured to reflect light passed by the first polarizing beam splitting surface back toward the first polarizing beam splitting surface;
    a quarter wave plate positioned between the first polarizing beam splitting surface and the mirror along the optical path;
    a second polarizing beam splitting surface disposed downstream of the first polarizing beam splitting surface and the mirror along the optical path, the second polarizing beam splitting surface being positioned at an angle relative to the first polarizing beam splitting surface; and
    a microdisplay disposed downstream of the second polarizing beam splitting surface along the optical path, the microdisplay configured to produce an image from light received from the second polarizing beam splitting surface.

2. The near-eye display system of claim 1, further comprising a polarization adjuster positioned between the second polarizing beam splitting surface and the microdisplay.

3. The near-eye display system of claim 2, further comprising a doublet lens positioned between the second polarizing beam splitting surface and the polarization adjuster.

4. The near-eye display system of claim 1, further comprising a total internal reflection (TIR) surface configured to reflect light from the first polarizing beam splitting surface to the second polarizing beam splitting surface.

5. The near-eye display system of claim 1, further comprising a collector and focusing lens positioned between the light source and the first polarizing beam splitting surface in a direction of light emission.

6. The near-eye display system of claim 5, further comprising a negative lens element positioned between the focusing lens and the first polarizing beam splitting surface.

7. The near-eye display system of claim 1, wherein the light source comprises a plurality of light-emitting diodes (LEDs).

8. The near-eye display system of claim 7, further comprising one or more dichroic beam splitters configured to reflect light from at least one of the plurality of LEDs and pass light from another one of the plurality of LEDs.

9. The near-eye display system of claim 1, wherein the microdisplay comprises a liquid crystal on silicon (LCoS) display.

10. The near-eye display system of claim 1, wherein the microdisplay comprises a liquid crystal display.

11. The near-eye display system of claim 1, wherein the second polarizing beam splitting surface is oriented at an angle of 20 degrees to 50 degrees with respect to a longitudinal axis of the microdisplay.

12. A method of directing light through a near-eye display system, the method comprising:
    outputting light from a light source;
    passing a portion of the light from the light source through a first polarizing beam splitting surface based on a polarization of the portion of the light;
    directing the portion of the light through a quarter wave plate and toward a mirror, the mirror configured to reflect the portion of the light back through the quarter wave plate and toward the first polarizing beam splitting surface;
    reflecting the portion of the light by the first polarizing beam splitting surface toward a second polarizing beam splitting surface;
    reflecting the portion of the light by the second polarizing beam splitting surface toward a microdisplay; and
    producing an image with the microdisplay.

13. The method of claim 12, wherein producing an image with the microdisplay further comprises reflecting light back toward the second polarizing beam splitting surface and through a polarization adjuster positioned between the microdisplay and the second polarizing beam splitting surface.

14. The method of claim 12, further comprising directing the light from the light source through a microlens array before directing the light to the first polarizing beam splitting surface.

15. An optical system for a near-eye display system, the optical system comprising:
    a light source configured to emit light;
    a first polarizing beam splitter surface configured to pass a first portion of the light and to reflect a second portion of the light;
    a quarter wave plate configured to rotate polarization of the first portion of the light;
    a mirror configured to reflect the first portion of the light back through the quarter wave plate and toward the first polarizing beam splitter surface; and
    a second polarizing beam splitter surface configured to receive the first portion of the light as reflected from the first polarizing beam splitter surface and reflect the first portion of the light through a polarization adjuster and toward a microdisplay, the microdisplay configured to reflect the first portion of the light back through the polarization adjuster and toward the second polarizing beam splitter surface.

16. The optical system of claim 15, further comprising a microlens array configured to receive the light from the light source and direct the light toward the first polarizing beam splitter surface.

17. The optical system of claim 16, further comprising a negative lens element positioned between the microlens array and the first polarizing beam splitter surface.

18. The optical system of claim 17, further comprising one or more dichroic beam splitters configured to receive light from the plurality of color light-emitting diodes, each dichroic beam splitter configured to pass light from a first light source and reflect light from another light source.

19. The optical system of claim 15, wherein the light source further comprises a plurality of color light-emitting diodes (LEDs).

20. The optical system of claim 15, wherein the near-eye display assembly is included in a head-mounted display device.

* * * * *